(12) United States Patent
Wohlrab

(10) Patent No.: US 6,926,515 B2
(45) Date of Patent: Aug. 9, 2005

(54) INJECTION MOLDING MACHINE WITH IMPROVED TRACTION TRANSMITTING SECURING MECHANISM

(75) Inventor: Walter Wohlrab, Weissenburg (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 291 days.

(21) Appl. No.: 10/431,268

(22) Filed: May 7, 2003

(65) Prior Publication Data
US 2003/0203068 A1 Oct. 30, 2003

Related U.S. Application Data

(63) Continuation of application No. PCT/EP01/13218, filed on Nov. 15, 2001.

(30) Foreign Application Priority Data
Nov. 17, 2000 (DE) .......................... 100 57 302

(51) Int. Cl.[7] .............................................. B29C 45/64
(52) U.S. Cl. ..................................... 425/595; 425/451.9
(58) Field of Search ............................... 425/595, 451.9

(56) References Cited

U.S. PATENT DOCUMENTS

| | | | |
|---|---|---|---|
| 2,870,668 A | | 1/1959 | Flahaut |
| 4,266,590 A | | 5/1981 | McKewan |
| 4,304,540 A | * | 12/1981 | Hammon ..................... 425/595 |
| 4,504,208 A | * | 3/1985 | Kurumaji et al. ........... 425/595 |
| 4,840,526 A | | 6/1989 | Bourdonne |
| 4,846,614 A | | 7/1989 | Steinbock |
| 4,874,309 A | * | 10/1989 | Kushibe et al. ............. 425/595 |
| 5,129,817 A | * | 7/1992 | Ing et al. ..................... 425/595 |
| 5,160,750 A | * | 11/1992 | Holbrook ..................... 425/595 |
| 5,370,012 A | | 12/1994 | Stanley |
| 5,417,913 A | * | 5/1995 | Arend ......................... 425/595 |
| 5,853,773 A | * | 12/1998 | Choi ........................... 425/595 |
| 6,250,905 B1 | * | 6/2001 | Mailliet et al. ............. 425/595 |

FOREIGN PATENT DOCUMENTS

| | | |
|---|---|---|
| DE | 1 962 872 | 7/1970 |
| DE | 41 15 756 A | 11/1992 |
| DE | 44 12 539 A1 | 10/1994 |
| DE | 196 41 578 A1 | 4/1998 |
| DE | 199 40 976 A1 | 3/2000 |
| GB | 1021655 | 3/1966 |
| GB | 1032814 | 6/1966 |

OTHER PUBLICATIONS

Rollengewindtriebe und Lagerkomponenten, Baueinheiten, Druckschrift RGT, Ina Lineartechnik oHG, 1999.

* cited by examiner

Primary Examiner—James P. Mackey
(74) Attorney, Agent, or Firm—Henry M. Feiereisen

(57) ABSTRACT

An injection molding machine includes a stationary platen, a movable platen constructed for movement relative to the stationary platen, at least one tie bar for tension-proof connection of the fixed and movable platens, and a traction transmitting securing device including a securing element, disposed on a rear side of one of the platens, for interacting with the tie bar within an engagement zone. The securing element and the tie bar are provided with a number of projections and recesses in axial spaced-apart relationship to establish a form-fitting connection, whereby the projections and the recesses are pressed together when exposed to a tensile stress and interlock at an axial clearance which increases along the engagement zone in axial direction corresponding to the tensile stress of the tie bar.

9 Claims, 2 Drawing Sheets

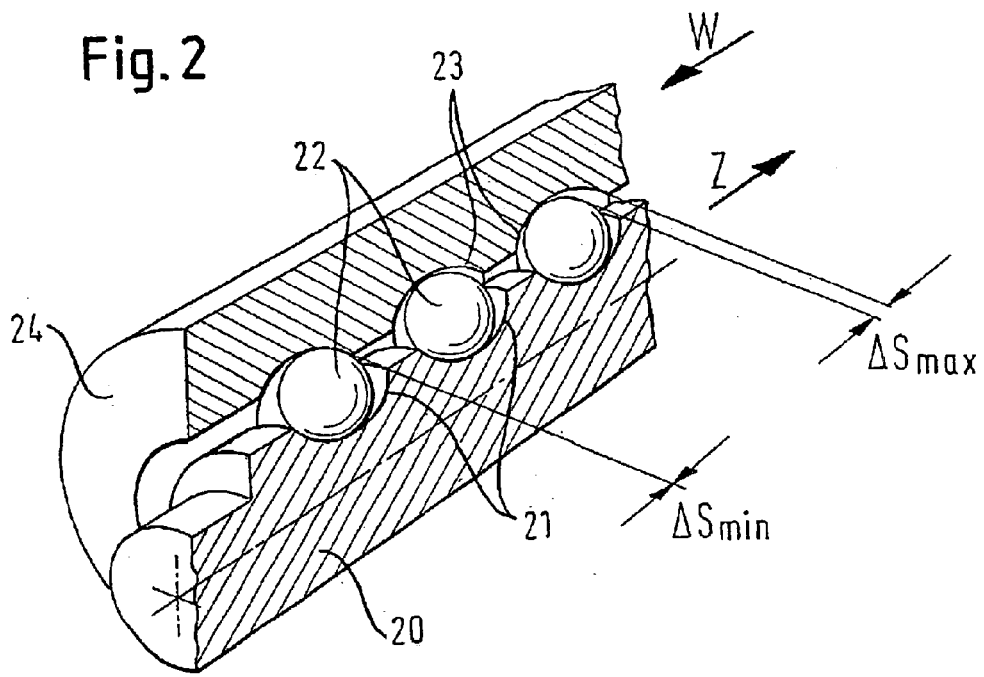
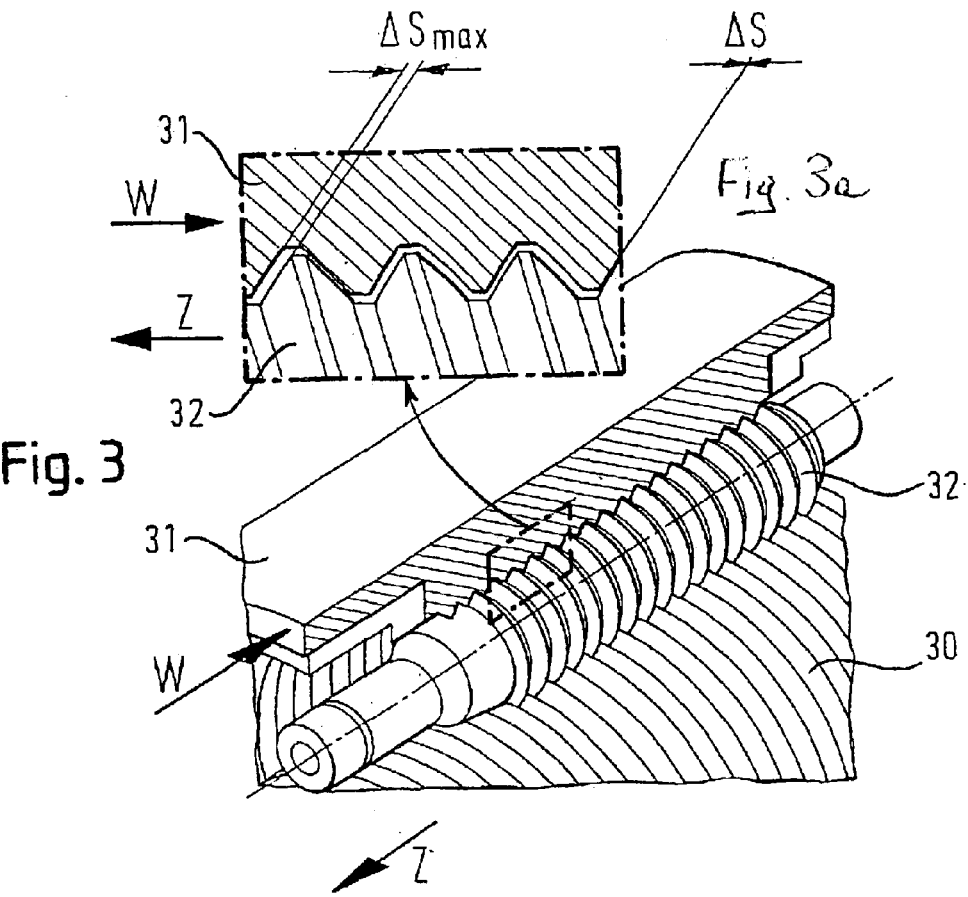

INJECTION MOLDING MACHINE WITH IMPROVED TRACTION TRANSMITTING SECURING MECHANISM

CROSS-REFERENCES TO RELATED APPLICATIONS

This application is a continuation of prior filed copending PCT International application no. PCT/EP01/13218, filed Nov. 15, 2001, on which priority is claimed under 35 U.S.C. §120, the disclosure of which is hereby incorporated by reference.

This application claims the priority of German Patent Application, Serial No. 100 57 302.9, filed Nov. 17, 2000, pursuant to 35 U.S.C. 119(a)–(d), the disclosure of which is incorporated herein by reference.

BACKGROUND OF THE INVENTION

The present invention relates, in general, to an injection molding machine of a type having a stationary platen and a movable platen connected to one another in a tension-proof manner by at least one tie bar, and more particularly to a traction transmitting securing mechanism for use in an injection molding machine and having a securing element connected form-fittingly with the tie bar in an engagement zone via interlocking projections and recesses.

Injection molding machine oftentimes encounter a problem relating to the fact that the force, generated as a result of a stretching of the tie bar(s) and compression of the securing element in the engagement zone, can be transmitted via only very few projections and recesses, typically only two to three, so that stress peaks occur in these components. Oftentimes, this causes the tie bar to break off at those spots. These stress peaks are encountered on the tie bar ends which project beyond the backside of the platen and are formed with recesses and annular grooves for engagement by the inwardly projecting semicircular ring-shaped ribs of the clamping clamps.

It is generally known, to compensate stress peaks in the area of the abutment through provision of specially designed nuts, e.g. tension nuts. While this approach results in a significant increase in structural complexity, the presence of stress peaks, and thus damage to the components, can still not reliably be eliminated.

It would therefore be desirable and advantageous to provide an improved injection molding machine, to obviate prior art shortcomings and to prevent the presence of stress peaks while still being simple in structure.

SUMMARY OF THE INVENTION

According to one aspect of the present invention, an injection molding machine includes a stationary platen, a movable platen constructed for movement relative to the stationary platen, at least one tie bar for tension-proof connection of the fixed and movable platens, and a traction transmitting securing device including a securing element, disposed on a rear side of one of the platens, for interacting with the tie bar within an engagement zone, wherein one of the securing element and the tie bar has a number of projections in axial spaced-apart relationship, and the other one of the securing element and the tie bar has a number of recesses disposed in axial spaced-apart relationship and engageable by the projections to establish a form-fitting connection, wherein the projections and the recesses are pressed together when exposed to a tensile stress and interlock at an axial clearance which increases along the engagement zone in axial direction corresponding to the tensile stress of the tie bar.

According to another feature of the present invention, the tie bar may be configured as a screw bolt, and the securing element may be configured as a nut, wherein the projections and the recesses are configured as meshing threads, with the increase of the clearance in the engagement zone being realized by slight differences of the helix angle of the threads of the screw bolt and the nut.

According to another feature of the present invention, the tie bar may be configured as a spindle bolt formed with thread grooves, and the securing element may be a spindle nut, wherein the thread grooves of the spindle bolt and the thread grooves of the spindle nut are connected in a form-fitting manner via rolling elements, disposed in the thread grooves of the spindle bolt and the thread grooves of the spindle nut, wherein the increase in clearance in the engagement zone is realized by slight differences of the helix angle of the thread grooves of the spindle bolt and the thread grooves of the spindle nut. Suitably the spindle bolt, the rolling elements and the spindle nut form part of a ball screw mechanism.

According to another feature of the present invention, the tie bar may be configured as a threaded spindle, and the securing element may be configured as a threaded nut of a roller screw mechanism which further includes thread rollers disposed in the threaded nut in axis-parallel relationship, wherein the threaded spindle, the threaded rollers and the threaded nut have threads meshing in a form-fitting manner, and wherein the increase in flank clearance in the engagement zone is realized by slight differences of the helix angle of the threads of the threaded spindle bolt, on the one hand, and the threaded rollers and the threaded nut, on the other hand, or by slight differences of the helix angle of the threads of the threaded spindle bolt and the threaded rollers, on the one hand, and the threaded nut, on the other hand.

According to another feature of the present invention, the projections and the recesses are annular grooves interlocking in form-fitting manner, and the securing element is configured as a split locking element. Suitably, the split clamping element has inwardly projecting ribs of semicircular ring-shaped configuration for engagement in complementary annular grooves of the tie bar.

According to another feature of the present invention, the bolt element may include a toothed rack having a number of projections in the form of teeth in axial spaced-apart relationship, and the securing element may include detent pawls in axial spaced-apart relationship for form-fitting engagement between the teeth.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 is a schematic fragmentary perspective view of a ball screw mechanism, incorporating the subject matter according to the present invention;

FIG. 3 is a schematic fragmentary perspective view of a roller screw mechanism, incorporating the subject matter according to the present invention;

FIG. 3a is an enlarged detailed view of the area delimited in FIG. 3; and

DETAILED DESCRIPTION OF PREFERRED EMBODIMENTS

Figure 1:
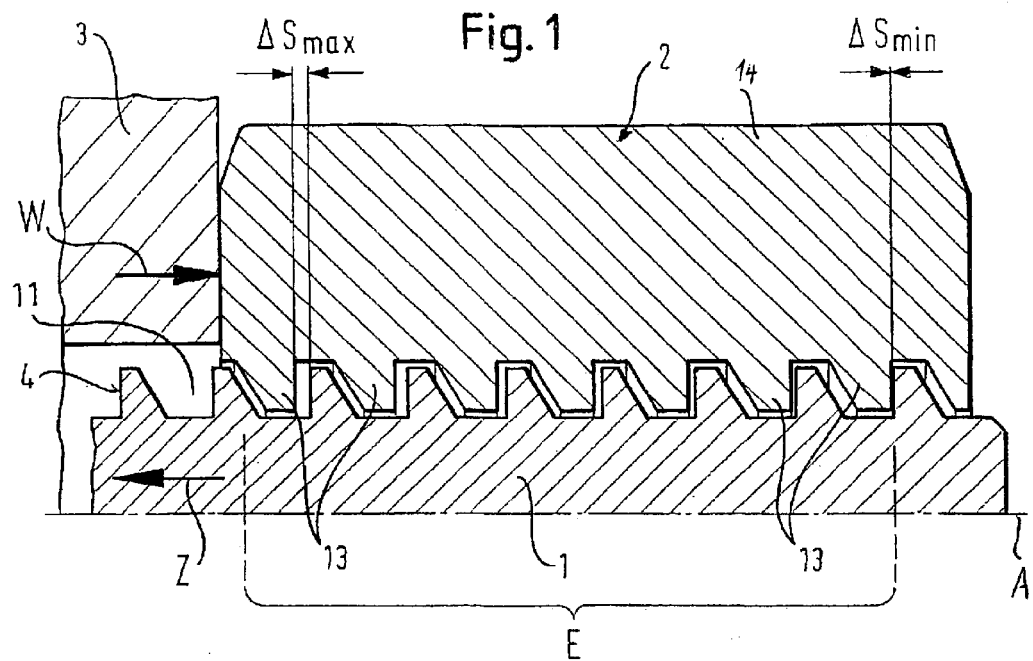
FIG. 1 is a schematic fragmentary illustration of a screw and nut connection, incorporating the subject matter according to the present invention.

Throughout all the Figures, same or corresponding elements are generally indicated by same reference numerals. These depicted embodiments are to be understood as illustrative of the invention and not as limiting in any way.

Turning now to the drawing, and in particular to FIG. 1, there is shown a schematic fragmentary illustration of a screw and nut connection, including a screw bolt 1 which defines an axis A, a nut 2, and an abutment 3. The screw bolt 1 is formed with a buttress thread having load-carrying flanks 4 extending in vertical relationship to the axis A of the screw bolt 1. The nut 2 has an internal thread which substantially complements the buttress thread of the screw bolt 1. The screw bolt 1 is exposed to a tensile load Z so that the nut 2 is pressed by a force W against the abutment 3. The internal thread of the nut 2 and the thread of the screw bolt 1 mesh along the length of an engagement zone E.

In accordance with the invention, the pitch of the buttress thread of the screw bolt 1 is slightly smaller than the pitch of the internal tread of the nut 2. As a consequence of this configuration, the flank play or clearance ΔS at the flank 4 at the one end of the engagement zone E, which is distal to the attack point of the tensile load Z, here the "trailing" end on the right side of FIG. 1, is at a minimum $\Delta S_{min}$ which is preferably zero. The flank clearance ΔS uniformly increases in the direction of the tensile load Z to the other end of the engagement zone E until reaching a maximum flank clearance $\Delta S_{max}$. Thus, when the screw bolt 1 is subjected to the tensile load Z, the flanks 4 in the area of the trailing end of the engagement zone E enter first into a force-transmitting contact, and only as the tensile load Z rises will the flanks 4 in the leading area of the engagement zone E gradually enter into a force-transmitting contact until ultimately all flanks 4 are involved across the entire length of the engagement zone E for force transmission, when the tensile load Z is at a maximum. As a result, the expansion that the screw bolt 1 undergoes in response to the maximum tensile load Z is substantially spread evenly across the entire length of the engagement zone E so that the presence of stress peaks in the leading zone of the engagement zone E is prevented.

As the tensile load Z increases in a screw thread, the force-transmitting contact of the flanks 4 is effected continuously along a helical path in correspondence to the flank pattern.

The preceding description of FIG. 1 relates to a configuration of a screw and nut connection which incorporates a traction-transmitting securing mechanism according to the present invention. In a same manner, the configuration of FIG. 1 may also equally be applicable for a second embodiment in which reference numeral 1 designates a bolt element having recesses 11 or parallel grooves in axial spaced-apart relationship and exhibiting vertical flanks 4. Reference numeral 2 designates here a split securing element having two parts 14, 15 (FIG. 1 shows only part 14, part 15 is shown, e.g., in FIG. 4) which have each projections 13 of substantially complementary configuration to the grooves 11 for engagement therein. The flank clearance ΔS between the flanks 4 of the bolt element 1 and the complementary confronting flanks of the projections 13 of the securing element 2 is at a minimum at the "trailing" end of the engagement zone E, designated by $\Delta S_{min}$, preferably zero, and increases steadily in the direction of the tensile load Z to the other "leading" end of the engagement zone E until reaching the maximum flank clearance $\Delta S_{max}$.

Thus, as the bolt element 1 is subjected to a tensile load Z, first the flanks 4 in the "trailing" area of the engagement zone E enter in force-transmitting contact. As the tensile load Z rises, the flanks 4 in the "leading" area of the engagement zone E enter into force-transmitting contact, step-by-step, until the tensile load Z is at a maximum and all flanks 4 effectuate a force transmission evenly over the entire length of the engagement zone E. As a result, the expansion that the bolt element 1 undergoes in response to the maximum tensile load Z is substantially spread evenly across the entire length of the engagement zone E so that the presence of stress peaks in the leading zone of the engagement zone E is prevented.

The configuration of FIG. 1 may further equally be applicable for a third embodiment in which reference numeral 1 designates a bolt element in the form of a toothed rack having a number of projections in the form of teeth in axial spaced-apart relationship, and the securing element 2 may include detent pawls in axial spaced-apart relationship for form-fitting engagement between the teeth.

FIG. 2 shows a schematic fragmentary perspective view of a ball screw mechanism, having a bolt element in the form of a spindle bolt 20 which is provided with thread grooves 21 to receive a plurality of balls 22 as rolling elements. The balls 22 are also in engagement with thread grooves 23 of a spindle nut 24 which is in surrounding relationship to the spindle bolt 20. In accordance with the invention, there is a clearance ΔS between the balls 22 in the thread grooves 21 of the spindle bolt 20 and the thread grooves 23 of the spindle nut 24, whereby the clearance ΔS is at a minimum clearance $\Delta S_{min}$, preferably zero, at the trailing distal end with respect to the tensile load Z, and uniformly increases in the direction of the tensile load Z until reaching the maximum clearance $\Delta S_{max}$ at the leading end of the spindle nut 24. It will be appreciated by persons skilled in the art that the novel and inventive principle is shown in FIG. 2 only in a highly schematic manner, i.e. with reference to only three balls 22, with the left ball positioned without clearance, i.e. $\Delta S_{min}$, in both thread grooves 21 and 23 in force-transmitting contact, while already the ball after the next ball, i.e. the right hand ball, is positioned at a maximum clearance $\Delta S_{max}$ with respect to the thread groove 23 of the spindle nut 24.

As the spindle bolt 20 is subjected to the tensile load Z, the balls 22 in the leading area first enter into a force-transmitting contact with the thread grooves 23 of the spindle nut 24. As the tensile load Z increases, also the trailing balls 22 enter gradually into force-transmitting contact until ultimately, when the tensile load Z is at a maximum, all balls 22, surrounded by the spindle nut 24, are involved uniformly in the force transmission.

Turning now to FIG. 3, there is shown a roller screw mechanism of a type described in a brochure published by INA Lineartechnik oHG, Homburg (Saar); 1999 Mar. 8th revision and having a bolt element in the form of a threaded spindle 30, and a securing element in the form of a threaded nut 31. Disposed between the threaded spindle 30 and the threaded nut 31 are threaded rollers 32 arranged in axis-parallel relationship and serving as rolling elements. The threads of the threaded spindle 30, threaded rollers 32 and threaded nut 31 mesh with one another in form-fitting manner, wherein the length of the threaded rollers 32 is essentially determinative for the engagement zone E of the roller screw mechanism.

In accordance with the invention, a flank clearance ΔS is adjusted between the flanks of the threads of the threaded rollers 32 and the flanks of the threads of the threaded nut 3, whereby the flank clearance ΔS is at a minimum, preferably zero, at the end distal to the tensile load Z, and increases evenly in the direction of the tensile load Z until reaching a maximum $\Delta S_{max}$ at the leading end of the threaded nut 31, as shown in FIG. 3a. As the threaded spindle 30 is subjected to the tensile load Z, the flanks of the threaded rollers 32 and the threaded nut 31 in the trailing area are first to enter into a force-transmitting contact. As the tensile load Z increases, also the flanks in the leading area enter gradually into force-transmitting contact until ultimately, when the tensile load Z is at a maximum, all flanks are involved uniformly in the force transmission.

The afore-described flank clearance ΔS is preferably provided in a same manner between the flanks of the thread of the threaded spindle 30 and the threaded rollers 32 to ensure that an even load distribution is realized in the three threaded components, namely threaded spindle 30, threaded rollers 32 and threaded nut 31, and thus to prevent stress peaks. Unlike the balls screw mechanism, shown in FIG. 2, the roller screw mechanism exhibits a substantially higher load-carrying capability.

Figure 4:
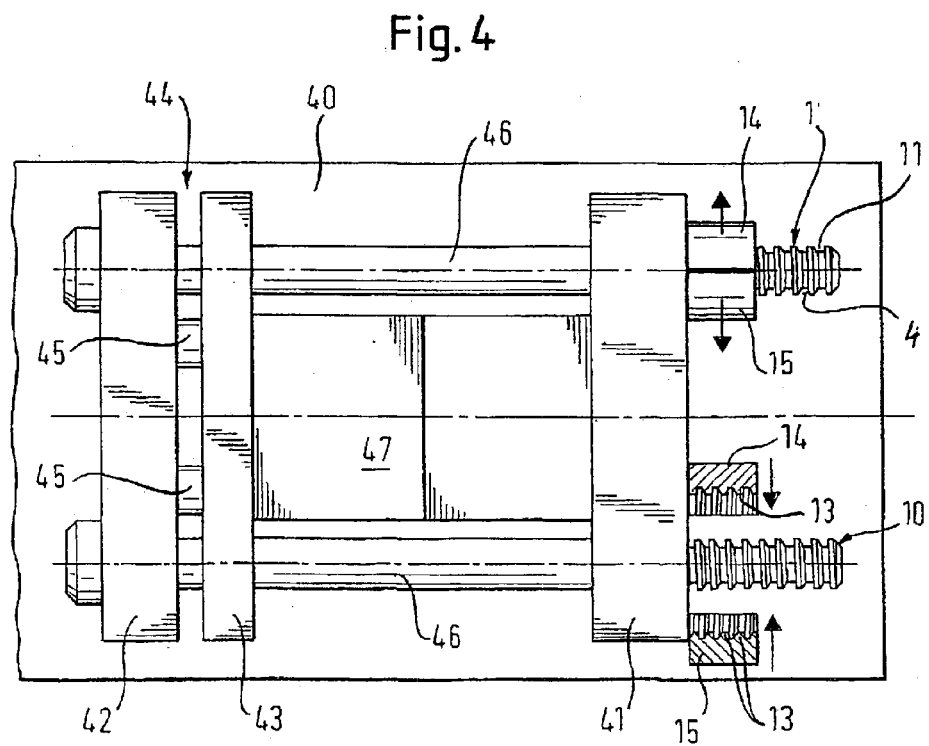
FIG. 4 is a top plan view of a basic configuration of a two-platen injection molding machine, incorporating the subject matter according to the present invention.

Turning now to FIG. 4, there is shown a top plan view of a basic configuration of a two-platen injection molding machine including a machine bed 40, a stationary platen 41 securely mounted to the machine bed 40, and a movable platen 44 comprised of a pressure pad 42 and a plate 43 and supported on the machine bed 40. Disposed between the pressure pad 42 and the plate 43 are pressure rams 46. The movable platen 44 is connectable to the stationary platen 41 in a tension-proof manner via tie bars 46 which extend through the stationary platen 41 and are mechanically lockable on the backside of the stationary platen 41. A molding tool 47 is located between the fixed and movable platens 41, 44.

Clamping is realized in a same manner as described in conjunction with the second option described with reference to FIG. 1. Parts corresponding with those in FIG. 1 are therefore denoted by identical reference numerals. The ends of the tie bars 46, extending beyond the stationary platen 41 correspond to the bolt elements 1 with the recesses 11 or parallel grooves in spaced-apart relationship. The recesses 11 have flanks 4 in vertical relationship to the axis A of the bolt elements 1 and are engaged by substantially complementary projections 13 of the split securing element 2. The upper area of FIG. 4 shows the components 14, 15 of the securing element 2 in a clamping position, whereas the lower area of FIG. 4 shows the components 14, 15 of the securing elements, by way of a sectional illustration, in the release position. Since the traction transmitting securing mechanism is identical to the embodiment shown in FIG. 1, a further detailed description thereof is omitted for the sake of simplicity.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. An injection molding machine, comprising:
   a stationary platen;
   a movable platen constructed for movement relative to the stationary platen;
   at least one tie bar for tension-proof connection of the stationary and movable platens; and
   a traction transmitting securing device including a securing element, disposed on a rear side of one of the platens, for interacting with the tie bar within an engagement zone, wherein one of the securing element and the tie bar has a number of projections in axial spaced-apart relationship, and the other one of the securing element and the tie bar has a number of recesses disposed in axial spaced-apart relationship and engageable by the projections to establish a form-fitting connection, wherein the projections and the recesses are pressed together when exposed to a tensile stress and interlock at an axial clearance which increases along the engagement zone in axial direction corresponding to the tensile stress of the tie bar.

2. The injection molding machine of claim 1, wherein the tie bar is configured as a screw bolt, and the securing element is configured as a nut, wherein the projections and the recesses are configured as meshing threads, with the increase of the clearance in the engagement zone being realized by slight differences of the helix angle of the threads of the screw bolt and the nut.

3. The injection molding machine of claim 1, wherein the tie bar is configured as a spindle bolt formed with thread grooves, and the securing element is a spindle nut, wherein the thread grooves of the spindle bolt and the thread grooves of the spindle nut are connected in a form-fitting manner via rolling elements, disposed in the thread grooves of the spindle bolt and the thread grooves of the spindle nut, wherein the increase in clearance in the engagement zone is realized by slight differences of the helix angle of the thread grooves of the spindle bolt and the thread grooves of the spindle nut.

4. The injection molding machine of claim 3, wherein the spindle bolt, the rolling elements and the spindle nut form part of a ball screw mechanism.

5. The injection molding machine of claim 1, wherein the tie bar is configured as a threaded spindle, and the securing element is configured as a threaded nut of a roller screw mechanism which further includes thread rollers disposed in the threaded nut in axis-parallel relationship, wherein the threaded spindle, the threaded rollers and the threaded nut have threads meshing in a form-fitting manner, and wherein the increase in axial clearance in the engagement zone is realized by slight differences of the helix angle of the threads of the threaded spindle bolt, on the one hand, and the threaded rollers and the threaded nut, on the other hand.

6. The injection molding machine of claim 1, wherein the tie bar is configured as a threaded spindle, and the securing element is configured as a threaded nut of a roller screw mechanism which further includes thread rollers disposed in the threaded nut in axis-parallel relationship, wherein the threaded spindle, the threaded rollers and the threaded nut have threads meshing in a form-fitting manner, and wherein the increase in axial clearance in the engagement zone is realized by slight differences of the helix angle of the threads of the threaded spindle and the threaded rollers, on the one hand, and the threaded nut, on the other hand.

7. The injection molding machine of claim 1, wherein the projections and the recesses are annular grooves interlocking in form-fitting manner, and the securing element is configured as a split locking element.

8. The injection molding machine of claim 7, wherein the split locking element has inwardly projecting ribs of semi-circular ring-shaped configuration for engagement in complementary annular grooves of the tie bar.

9. The injection molding machine of claim 1, wherein the tie bar is configured as a toothed rack having a number of projections in the form of teeth in axial spaced-apart relationship, and the securing element includes detent pawls in axial spaced-apart relationship for form-fitting engagement between the teeth.

* * * * *